US008082425B2

(12) United States Patent
Sudhakar et al.

(10) Patent No.: US 8,082,425 B2
(45) Date of Patent: Dec. 20, 2011

(54) RELIABLE EXECUTION USING COMPARE AND TRANSFER INSTRUCTION ON AN SMT MACHINE

(75) Inventors: Ranganathan Sudhakar, Santa Clara, CA (US); Nhon T. Quach, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 252 days.

(21) Appl. No.: 12/432,146

(22) Filed: Apr. 29, 2009

(65) Prior Publication Data
US 2010/0281239 A1 Nov. 4, 2010

(51) Int. Cl.
*G06F 9/46* (2006.01)
*G06F 11/14* (2006.01)
(52) U.S. Cl. ......................................... 712/226; 714/10
(58) Field of Classification Search ........................ None
See application file for complete search history.

(56) References Cited

U.S. PATENT DOCUMENTS

| | | | | |
|---|---|---|---|---|
| 5,226,152 | A | * | 7/1993 | Klug et al. ...................... 714/12 |
| 5,799,022 | A | | 8/1998 | Williams |
| 5,805,486 | A | * | 9/1998 | Sharangpani ................. 708/524 |
| 5,903,717 | A | | 5/1999 | Wardrop |
| 6,393,582 | B1 | | 5/2002 | Klecka et al. |
| 6,571,363 | B1 | | 5/2003 | Steiss |
| 6,640,313 | B1 | * | 10/2003 | Quach ............................ 714/10 |
| 6,823,473 | B2 | * | 11/2004 | Mukherjee ..................... 714/10 |
| 6,854,075 | B2 | * | 2/2005 | Mukherjee et al. ............. 714/51 |
| 6,862,693 | B2 | | 3/2005 | Chaudhry et al. |
| 6,928,583 | B2 | | 8/2005 | Griffin et al. |
| 7,003,691 | B2 | | 2/2006 | Safford et al. |
| 7,085,959 | B2 | | 8/2006 | Safford |
| 7,328,371 | B1 | | 2/2008 | Kalyanasundharam et al. |

(Continued)

FOREIGN PATENT DOCUMENTS
WO WO2009/089033 7/2009

OTHER PUBLICATIONS

Rotenberg (AR-SMT: A Microarchitectural Approach to Fault Tolerance in Microprocessors); This paper appears in: Fault-Tolerant Computing, 1999. Digest of Papers. Twenty-Ninth Annual International Symposium on; Issue Date: 1999 On pp. 84-91.*

(Continued)

*Primary Examiner* — Keith Vicary
(74) *Attorney, Agent, or Firm* — Rory D. Rankin; Meyertons, Hood, Kivlin, Kowert & Goetzel, P.C.

(57) ABSTRACT

A system and method for efficient reliable execution on a simultaneous multithreading machine. A processor is placed in a reliable execution mode (REM) to detect possible errors during execution of a software application. Only two threads may be configured to operate in this mode. Floating-point store and integer-transfer unary instructions may be converted to new instructions. Each new instruction has two source operands, each corresponding to a different thread is specified by a same logical register number as a single source operand of the original unary instruction. All other instructions are replicated, wherein the original instruction and its twin are assigned to different threads. Simultaneous multithreaded (SMT) floating-point logic may only be able to provide lockstep execution when it communicates using the new instruction with instantiated integer independent clusters. The new instruction cannot begin until both source operands are ready, which are subsequently compared to determine any mismatches or errors.

20 Claims, 4 Drawing Sheets

U.S. PATENT DOCUMENTS

| | | | | |
|---|---|---|---|---|
| 7,865,770 | B2* | 1/2011 | Quach | 714/11 |
| 2001/0034824 | A1* | 10/2001 | Mukherjee et al. | 712/215 |
| 2005/0015659 | A1* | 1/2005 | Pomaranski et al. | 714/11 |
| 2005/0050307 | A1* | 3/2005 | Reinhardt et al. | 712/227 |
| 2005/0108509 | A1 | 5/2005 | Safford et al. | |
| 2005/0138478 | A1* | 6/2005 | Safford et al. | 714/38 |
| 2008/0244354 | A1* | 10/2008 | Wu et al. | 714/755 |
| 2010/0169628 | A1* | 7/2010 | Hinton et al. | 712/244 |

OTHER PUBLICATIONS

Reinhardt et al. (Transient Fault Detection via Simultaneous Multithreading); ISCA '00 Proceedings of the 27th annual international symposium on Computer architecture; 2000, pp. 25-36.*

Reddy et al. (Understanding Prediction-Based Partial Redundant Threading for Low-Overhead, High-Coverage Fault Tolerance); Proceeding ASPLOS-XII Proceedings of the 12th international conference on Architectural support for programming languages and operating systems; 2006, pp. 83-94.*

Li et al. (Design Trade-Offs and Deadlock Prevention in Transient Fault-Tolerant SMT Processors); This paper appears in: Dependable Computing, 2006. PRDC'06. 12th Pacific Rim International Symposium on; Issue Date: Dec. 2006; On pp. 315-322.*

Mukherjee, Shubhendu S., et al.; "Detailed Design and Evaluation of Redundant Multithreading Alternatives"; Proceedings of the 29th International Symposium on Computer Architecture; ISCA 2002, Anchorage, AL, May 25-29, 2002; ISCA, Los Alamitos, CA; IEEE Comp. Soc, May 25, 2002; pp. 99-110.

International Search Report and Written Opinion Application Serial No. PCT/US2010/032514 mailed Jul. 20, 2010.

* cited by examiner

RELIABLE EXECUTION USING COMPARE AND TRANSFER INSTRUCTION ON AN SMT MACHINE

BACKGROUND OF THE INVENTION

1. Field of the Invention

This invention relates to computing systems, and more particularly, to efficient reliable execution on a simultaneous multithreading machine.

2. Description of the Relevant Art

Mission critical software applications require high reliability. Some examples of these applications include financials and banking software, databases, and military applications. Software testing methods may be used to verify and validate a software application to a predetermined level of quality. However, problems may arise due to the hardware platform utilized to execute the application such as the microprocessor. Although a microprocessor may have been previously tested to meet predetermined quality requirements, as with the software application, testing under all combinations of inputs and preconditions, such as an initial state, is not feasible. In addition, besides functional errors, modern microprocessors may experience both hard errors, such as stuck-at faults, and soft errors such as radiation induced errors on storage nodes.

With both the node capacitance and the supply voltage decreasing over time with the next generations of new processors, the amount of electrical charge stored on a node decreases. Due to this fact, nodes are more susceptible to radiation induced soft errors caused by high energy particles such as cosmic rays, alpha particles, and neutrons. This radiation creates minority carriers at the source and drain regions of transistors to be transported by the source and drain diodes. The change in charge stored on a node compared to the total charge, which is decreasing with each generation, may be a large enough percentage that it surpasses the circuit's noise margin and alters the stored state of the node. Although the circuit is not permanently damaged by this radiation, a logic failure may occur.

For the above reason, memories such as static random access memory (SRAM) use error correcting code (ECC) to detect and correct soft errors. Sequential elements, such as flip-flops, may use larger capacitance nodes or redundant latches within their design in order to combat soft errors. However, nodes within combinatorial logic, such as integer and floating-point functional units, are also susceptible to soft errors. Therefore, testing that guards against functional errors and hard errors has not proven that combinatorial logic is safe against soft errors, which may be unacceptable for mission critical applications.

Regardless whether an error is due to failed functionality, a hard error, or a soft error, a mission critical application may have a low tolerance of an occurrence of any error and may not allow for repeat execution with a particular data set. In order to ensure correct operation of an application on particular hardware and to detect an error, two parallel executions of the application may be run with checkpoints. At each checkpoint, a comparison may be performed of resulting data of each execution that should be the same. Thus, the simultaneous executions are running in lockstep. Any difference detected by a comparison at a checkpoint may flag an error. Operation of the simultaneous executions may roll back for both executions to the previous successful checkpoint, and the parallel executions may be re-run from the checkpoint. Also, a flag or warning may be reported to a user. A user may decide to re-run the executions to see if a difference is found again at the problematic checkpoint or may decide to debug the application at the time a difference in resulting data is determined.

However, it may be difficult to perform efficient parallel lockstep execution. For example, using two microprocessors, wherein each microprocessor executes a copy of the application simultaneously and begins execution at the same time as the other microprocessor, may not provide lockstep execution due to reasons such as unequal direct memory access (DMA) times and unequal refresh operations. Therefore, it may be more advantageous to use one microprocessor with copies of hardware and functional units.

Many modern microprocessors utilize copies of cores in order to implement multi-threading operation, wherein each core may independently operate on a separate software thread simultaneously with other cores.

One manner to achieve lockstep execution of a mission critical application is to execute the application and a copy of the application simultaneously on two copies of a core within a microprocessor. If each core receives the same instruction, such as the original instruction in a first core and a twin copy of the instruction in a second core, then a comparison of relevant data may be performed in each clock cycle. Therefore, lockstep execution of the mission critical application may be achieved.

However, different factors may interrupt this lockstep execution. For example, not all hardware resources may be copied in order to achieve multi-threading operation within a microprocessor. A floating-point unit (FPU) contains complex logic that consumes a lot of on-die real estate. Also, FPU operations are not performed often. Therefore, a designer is not motivated to create independent expensive copies of floating-point logic on the die. Rather, multi-threading operation for a FPU and possibly other hardware resources on-die may be achieved by simultaneous multi-threading (SMT).

As with multi-threading, in SMT, instructions from more than one thread can be executing in any given pipeline stage at a time and may be used to hide memory latency and increase throughput of computations per amount of hardware used. However, SMT works by duplicating certain sections of the processor, such as those that store the architectural state, but not duplicating the main execution resources. This allows a SMT equipped processor to pretend to appear as two "logical" processors to the host operating system. The operating system may schedule two or more threads or processes simultaneously. Where execution resources in a non-SMT capable processor are not used by a current thread, and especially when the processor is stalled due to a cache miss, a branch misprediction, or other, a SMT equipped processor may use those execution resources to execute another scheduled thread.

The SMT hardware, such as a FPU, does not perform operations of two threads in lockstep. Therefore, any communication with hardware copies, such as two independent integer cluster copies, interrupts lockstep execution within the two integer clusters. Further, in order not to decrease performance of the microprocessor when it is not operating in a reliable execution mode, it is not desirable to modify any schedulers and renaming logic, and to route signals between the integer clusters in order to synchronize non-lockstep received signals from the FPU.

In view of the above, efficient methods and mechanisms for efficient reliable execution on a simultaneous multithreading machine.

SUMMARY OF THE INVENTION

Systems and methods for efficient reliable execution on a simultaneous multithreading machine are contemplated. In one embodiment, a computer system is provided comprising a cache and a processor. The processor may comprise a simultaneous multi-threaded (SMT) floating-point unit (FPU) and multiple instantiated integer independent clusters, wherein each cluster corresponding to a different strand, or hardware thread. In reliable execution mode (REM), the processor may be configured to operate on only two threads. Instructions of a mission critical software application may be executed on the processor. Each instruction that is not a floating-point external operation that communicates from the FPU to an integer cluster is replicated. The original instruction is assigned to a first thread. The twin copy instruction is assigned to a second thread.

The processor front-end and integer clusters may execute these instructions of the two threads in a lockstep manner. A checkpoint that includes a comparison of the two results may occur at retirement or at completion of execution depending on design requirements. A mismatch may cause the processor to convey error information to a predetermined location in the cache for a user to inspect.

Each instruction that is a floating-point external operation that communicates from the FPU to an integer cluster is transformed to a new instruction. Typically, a floating-point external operation is a unary instruction such as a floating-point store instruction or a floating-point integer-transfer instruction. Such an instruction is converted to a binary instruction, in the case that two threads are operating during REM operation. The two source operands correspond to each of the operating threads and is specified by a same logical register number as a single source operand of the first instruction.

During execution of this new instruction, the FPU needs to wait for both source operands to be ready, which is the normal operation of the floating-point scheduler. A comparison of the two source operands should determine a match. If a mismatch is found, then as described before, the processor conveys error information to a predetermined location in the cache for a user to inspect. The store or integer-transfer operation may still proceed or may halt execution depending on the desired design. If a match occurs, the FPU simultaneously conveys the result to the integer clusters. Therefore, the floating-point operations may execute out-of-sync, but communication from the FPU to the integer clusters provides in-sync operation. The processor continues to execute in a lockstep manner.

In another embodiment, a SMT FPU is provided that receives instructions from an instruction fetch unit as does multiple instantiated integer independent clusters. Logic within the FPU is configured to perform all of the above described steps when a processor is placed in a REM mode of operation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
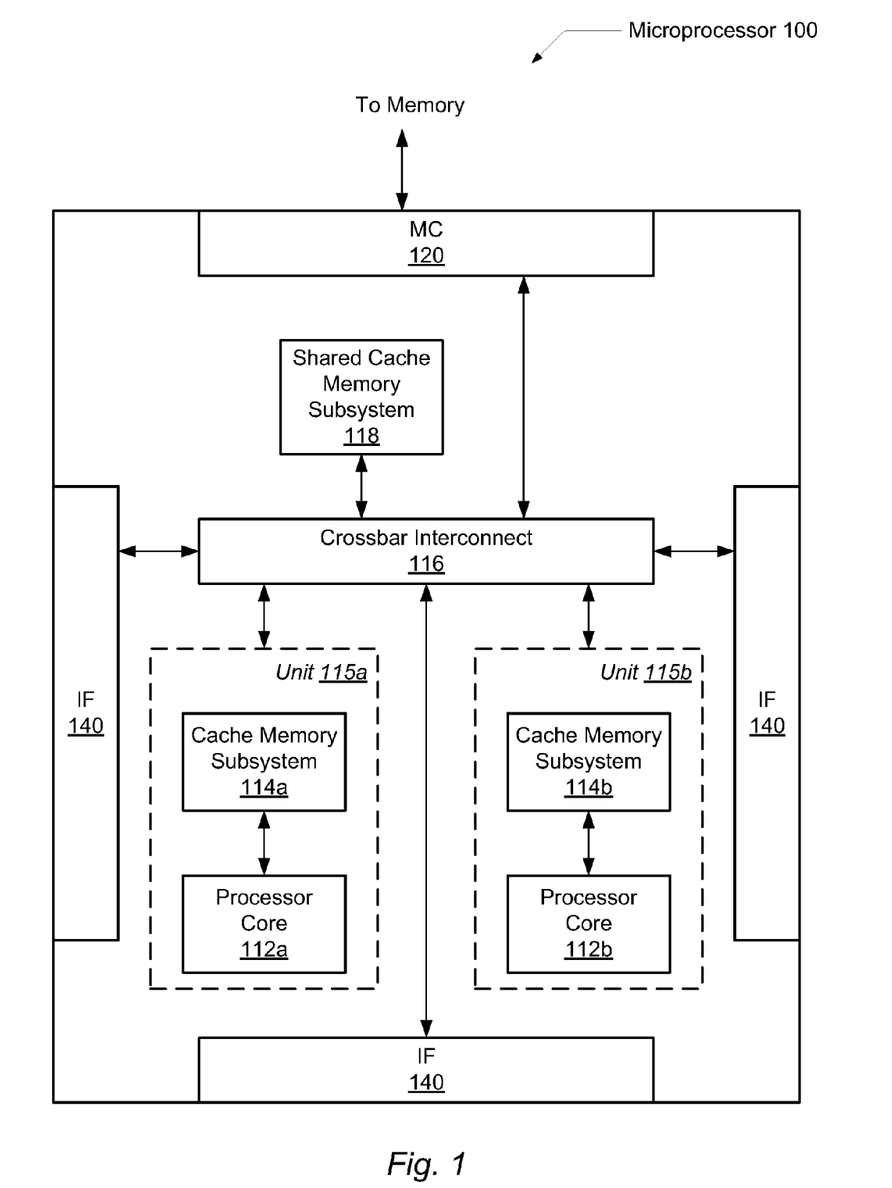
FIG. 1 is a generalized block diagram illustrating one embodiment of an exemplary microprocessor.

Referring to FIG. 1, one embodiment of an exemplary microprocessor 100 is shown. Microprocessor 100 may include memory controller 120, interface logic 140, one or more processing units 115, which may include one or more processor cores 112 and corresponding cache memory subsystems 114; crossbar interconnect logic 116, and a shared cache memory subsystem 118. In one embodiment, the illustrated functionality of microprocessor 100 is incorporated upon a single integrated circuit.

Interface 140 generally provides an interface for input/output (I/O) devices off the microprocessor 100 to the shared cache memory subsystem 118 and processing units 115. As used herein, elements referred to by a reference numeral followed by a letter may be collectively referred to by the numeral alone. For example, processing units 115a-115b may be collectively referred to as processing units 115, or units 115. I/O devices may include peripheral network devices such as printers, keyboards, monitors, cameras, card readers, hard or floppy disk drives or drive controllers, network interface cards, video accelerators, audio cards, modems, a variety of data acquisition cards such as General Purpose Interface Bus (GPIB) or field bus interface cards, or other. Additionally, interface 140 may be used to communicate with other microprocessors and/or other processing nodes. Generally, interface logic 140 may comprise buffers for receiving packets from a corresponding link and for buffering packets to be transmitted upon the a corresponding link. Any suitable flow control mechanism may be used for transmitting packets to and from microprocessor 100.

Microprocessor 100 may be coupled to a respective memory via a respective memory controller 120. Memory may comprise any suitable memory devices. For example, a memory may comprise one or more RAMBUS dynamic random access memories (DRAMs), synchronous DRAMs (SDRAMs), DRAM, static RAM, etc. The address space of microprocessor 100 may be divided among multiple memories. Each microprocessor 100 or a respective processing node comprising microprocessor 100 may include a memory map used to determine which addresses are mapped to which memories, and hence to which microprocessor 100 or processing node a memory request for a particular address should be routed. In one embodiment, the coherency point for an address is the memory controller 120 coupled to the memory storing bytes corresponding to the address. Memory controllers 120 may comprise control circuitry for interfacing to memories. Additionally, memory controllers 120 may include request queues for queuing memory requests.

Generally speaking, crossbar interconnect logic 116 is configured to respond to received control packets received on the links coupled to Interface 140, to generate control packets in response to processor cores 112 and/or cache memory subsystems 114, to generate probe commands and response packets in response to transactions selected by memory controller 120 for service, and to route packets for an intermediate node which comprises microprocessor to other nodes through interface logic 140. Interface logic 140 may include logic to receive packets and synchronize the packets to an internal clock used by crossbar interconnect 116. Crossbar interconnect 116 may be configured to convey memory requests from processor cores 112 to shared cache memory subsystem 118 or to memory controller 120 and the lower levels of the memory subsystem. Also, crossbar interconnect 116 may convey received memory lines and control signals from lower-level memory via memory controller 120 to processor cores 112 and caches memory subsystems 114 and 118. Interconnect bus implementations between crossbar interconnect 116, memory controller 120, interface 140, and processor units 115 may comprise any suitable technology.

Cache memory subsystems 114 and 118 may comprise high speed cache memories configured to store blocks of data. Cache memory subsystems 114 may be integrated within respective processor cores 112. Alternatively, cache memory subsystems 114 may be coupled to processor cores 112 in a backside cache configuration or an inline configuration, as desired. Still further, cache memory subsystems 114 may be implemented as a hierarchy of caches. Caches, which are nearer processor cores 112 (within the hierarchy), may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. Processor cores 112 include circuitry for executing instructions according to a predefined general-purpose instruction set. For example, the x86 instruction set architecture may be selected. Alternatively, the Alpha, PowerPC, or any other general-purpose instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller 120 en route to the location to which the missing block is mapped.

Figure 2:
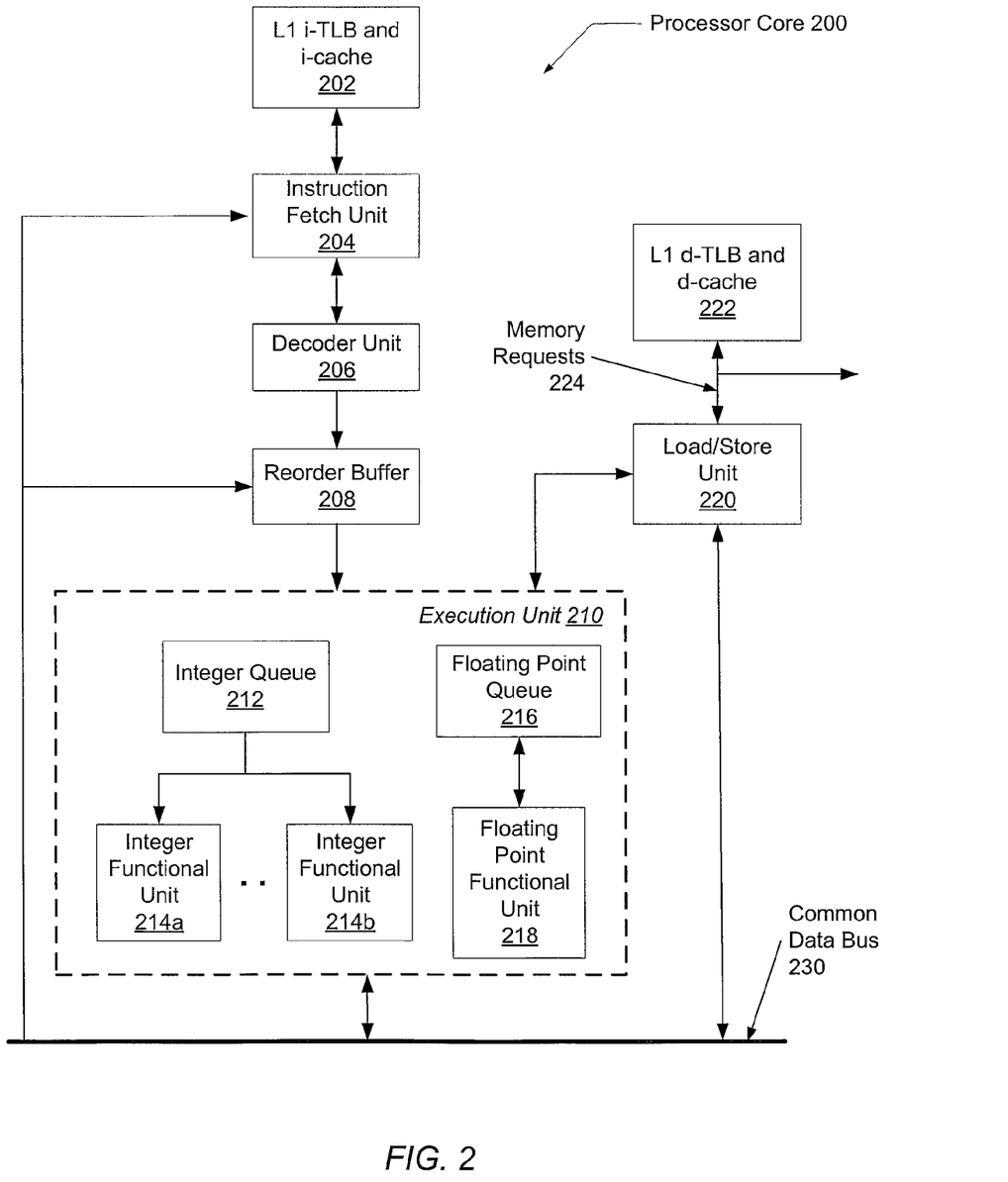
FIG. 2 is a generalized block diagram illustrating one embodiment of a general-purpose processor core that performs out-of-order execution.

FIG. 2 illustrates one embodiment of a general-purpose processor core 200 that performs out-of-order execution. An instruction-cache (i-cache) and corresponding translation-lookaside-buffer (TLB) 202 may store instructions for a software application and addresses in order to access the instructions. Both caches 202 and 222 may be located within processor core 200 or located outside such as in cache memory subsystem 114 of FIG. 1. The instruction fetch unit (IFU) 204 may fetch multiple instructions from the i-cache 202 per clock cycle if there are no i-cache misses. The IFU 204 may include a program counter that holds a pointer to an address of the next instructions to fetch in the i-cache 202, which may be compared to addresses in the i-TLB. The IFU 204 may also include a branch prediction unit to predict an outcome of a conditional instruction prior to an execution unit determining the actual outcome in a later pipeline stage.

The decoder unit 206 decodes the opcodes of the multiple fetched instructions and may allocate entries in an in-order retirement queue, such as reorder buffer 208. Entries may be allocated within integer queue 212 and floating-point queue 216 following the allocation within reorder buffer 208. Entries of an input queue within the load/store unit 220 may be allocated following the allocations within execution unit 210 or concurrently, if desired. The allocation of entries in the execution unit 210 and/or load/store unit 220 is considered dispatch. A discussion of the execution unit 210 will Is follow a description of memory accesses.

Memory accesses such as load and store operations are issued to the load/store unit 220. The load/store unit 220 may include queues and logic to execute a memory access instruction. Also, verification logic may reside in the load/store unit 220 to ensure a load instruction receives forwarded data from the correct youngest store instruction. The load/store unit 220 may send memory access requests 224 to the one or more levels of data cache (d-cache) 222 on the chip. Each level of cache may have its own TLB for address comparisons with the memory requests 224. Each level of cache 222 may be searched in a serial or parallel manner. If the requested memory line is not found in the caches 222, then a memory request 224 is sent to lower levels of cache memory such as caches 114 and 118, or possibly to off-chip memory. The serial or parallel searches, the possible requests to other memory, and the wait for the requested memory line to arrive may require a substantial number of clock cycles.

Results from the execution units 210 and the load/store unit 220 may be presented on a common data bus 230. The results may be sent to the reorder buffer 208. In one embodiment, the reorder buffer 208 may be a first-in first-out (FIFO) queue that ensures in-order retirement of instructions according to program order. Here, an instruction that receives its results is marked for retirement. If the instruction is head-of-the-queue, it may have its results sent to a corresponding architecture register file. Each of queues 212 and 216 may hold a corresponding architecture register file. The architecture register file may hold the architectural state of the general-purpose registers of processor core 200. Then the instruction in the reorder buffer may be retired in-order and its head-of-queue pointer may be adjusted to the subsequent instruction in program order.

The results on the common data bus 230 may be sent to execution unit 210 in order to forward values to operands of instructions waiting for the results. For example, an arithmetic instruction may have operands that depend on the results of a previous arithmetic instruction, or a load instruction may need an address calculated by an address generation unit (AGU) in the functional units 214. When these waiting instructions have values for their operands and hardware resources are available to execute the instructions, they may be issued out-of-order from the respective queues 212 and 216 to the appropriate resources in the functional units 214 and 216 or the load/store unit 220.

Uncommitted, or non-retired, memory access instructions have entries in the load/store unit 220. The forwarded data value for an in-flight, or uncommitted, load instruction from the youngest uncommitted older store instruction may be placed on the common data bus 230 or may be simply routed to the appropriate entry in a load buffer within the load/store unit 220.

Returning to execution unit 210, the queues 212 and 216 may store corresponding integer and floating-point instructions that wait for their operands to become available. Register renaming and execution scheduling may occur within queues 212 and 216 or within surrounding corresponding circuitry not shown. When operands are available and hardware resources are also available, an instruction may be issued out-of-order from the queues 212 and 216 to the integer functional units 214, the floating-point functional unit 218, and/or to the load/store unit 220. Each set of integer functional units 214 may include arithmetic logic units (ALU's) for integer computational calculations such as addition, subtraction, address-generation, and determination of an outcome of a branch conditional instruction. The floating-point functional unit 218 may include circuitry to perform floating-point addition, subtraction, multiplication, division, square root, integer to floating-point conversion, floating-point to integer conversion, or other.

In one embodiment, multiple integer functional units 214 may be instantiated in order to increase microprocessor instruction throughput. For example, processor core is 200 may be configured to execute multiple software threads of execution. An operating system for microprocessor 100, and corresponding processor core 200, allocates regions of memory for a software application. When a software application is compiled, the application may comprise multiple processes. In such an embodiment, each process may own its own resources such as an image of memory, or an instance of instructions and data before application execution. Also, each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Each process of the software application may be further split into software threads. Many modern microprocessors are configured to simultaneously execute two or more software threads. These microprocessors may have two or more hardware threads, or strands, available for parallel execution and assignment by the kernel of the operating system. For example, for a multi-threaded microprocessor, each integer functional unit 214 may receive one or more integer instructions of a particular thread per clock cycle depending on availability of hardware resources within a particular unit 214. The circuitry from instruction fetch unit 204 to integer queue 212 may be modified to manage the two or more strands of processor core 200 without duplicating the hardware of each unit. For example, registers holding architecture state of a thread may be duplicated, but execution hardware resources may not be duplicated.

In another embodiment, multi-threaded execution of processor core 200 may include instantiation of copies of an entire cluster, wherein a cluster is utilized for execution of a single thread and, in one embodiment, comprises the circuitry from decoder unit 206 to instruction functional unit 214. In such an embodiment, this circuitry may be referred to as an integer execution cluster. In another embodiment, a floating-point coprocessor may include the circuitry from decoder unit 206 to floating-point functional unit 218. There may be a less number of instantiations of this floating-point coprocessor than there are instantiations of an integer execution cluster. In such an embodiment, each floating-point coprocessor corresponds to two or more threads, whereas each integer execution cluster corresponds to a single different thread. Instruction fetch unit 204 would include circuitry to manage the multiple threads in core 200 and supply each cluster with one or more available corresponding instructions of a particular thread. In this case, each cluster is a strand, or hardware thread.

Although it may be desirable to instantiate multiple copies of floating-point unit 218 to accompany each copy of integer functional unit 214 from a circuit logic point-of-view, it may not be desirable from a hardware implementation point-of-view. For example, floating-point functional unit (FPU) 218 may contain complex logic that consumes a lot of on-die real estate. Also, floating-point operations are not performed often in program code. Therefore, a hardware designer may not be motivated to create independent expensive copies of floating-point functional unit 218 on the die.

Microprocessor 100, and correspondingly, processor core 200, may be implemented with a reliable execution mode (REM) of operation. This mode may be utilized to detect the occurrence of execution errors, such as hardware soft errors, during execution of a mission critical software application. In one embodiment, the floating-point queue 216 and floating-point functional unit 218 of processor core 200 may operate in simultaneous multi-threading (SMT) mode in order to serve two independent software threads executing on two independent integer execution clusters or two independent integer functional units, wherein both implementations are independent strands. In one embodiment, IFU 204 may be implemented as a SMT circuit to supply instructions to two strands. The circuitry from decoder unit 206 to integer functional unit 214 may be instantiated as one integer strand on the die. A second integer strand, which is a copy of this first strand, may be also instantiated on the die.

The two integer strands may operate in lockstep from the output of the IFU 204 to the output of a respective integer functional unit 214. For example, if instructions of a software thread is supplied to the first integer strand, and a copy of this thread is supplied to the second integer strand, then each pipeline stage of the two strands should yield the same results at the end of each respective clock cycle. Rather than perform a comparison at the end of each clock cycle, multiple check-point instructions may be inserted in the program code. During each checkpoint, a comparison of the contents of specified registers may be performed of the two strands. If the corresponding values match, then no soft error is detected, and execution may continue. If a mismatch is found, in one embodiment, execution may rollback to the last successful checkpoint and execution may proceed from this location in the program code. In one embodiment, a warning may be reported to the operating system (OS). In an alternative embodiment, a warning report may be recorded in a log file at a predetermined location in memory for the user to peruse.

In another embodiment, the circuitry from decoder unit 206 to integer queue 212 may not be copied, but implemented as SMT units. Integer functional units 214 may be copied. Again, in one embodiment, the execution of two integer strands may operate in lockstep from the output of the IFU 204 to the output of a respective integer functional unit 214. Checks and comparisons may be performed as described above. The utilization of two strands is for illustrative purposes and the utilization of more strands is possible and contemplated. For example, in alternative embodiments, as described above regarding processes, the circuitry of a microprocessor may be configured to execute two or more software threads requiring two or more hardware threads, or strands. The Therefore, the execution of three or more integer strands may operate in lockstep from the output of the IFU 204 to the output of a respective integer functional unit 214.

With either embodiment described above, the floating point queue 216, floating-point functional unit 218, load/store unit (LSU) 220 and cache 222 may be instantiated separately and receive inputs from the integer queue(s) 212 and two separate instantiated integer functional units 214. As described above, a single software application may be executed with high reliability by running two copies of it, one on each integer strand, in lockstep. However, this technique cannot be applied to the floating-point queue 216 and floating-point functional unit 218, because it is not guaranteed that operations from the different threads will execute in lockstep. For a SMT portion of the chip, such as the floating-point functional unit 218, there may not be sufficient hardware resources to execute an instruction from two software threads simultaneously. Therefore, these instructions from two software threads may be executed out of sync, rather than lockstep.

One solution to this problem would be to force both software threads to run in lockstep on the SMT floating-point circuitry. However, this proposal has huge costs in complexity, on-die real estate, extra on-die wire routing, and also reduces performance when REM operation is not needed. Another solution to the problem is to allow floating-point instructions of both software threads to run independently on the floating-point functional unit 218 and produce results asynchronously. Cross-checking the results across both software threads must then be delayed for each operation until the later of the two software threads computes a result. Since this delay may be very large, such as hundreds of clock cycles, and every operation in the code stream needs to be checked, a designer must allocate very large buffers to capture the results from both threads until they may be safely checked.

Instead, a technique may be used for REM operation whereby two instructions, such as an original instruction and its twin copy, of two "separate" software threads—again, the original software thread and its twin copy—are allowed to execute out-of-sync on the SMT floating-point circuitry most of the time. The two threads are synchronized and compared for divergence only when they attempt to communicate results across the floating-point domain, thus ensuring synchronized stimuli to the two integer clusters. This allows the integer clusters to see identical responses from both threads on all communication from the floating-point circuitry, so they can remain in lockstep.

Figure 3A:
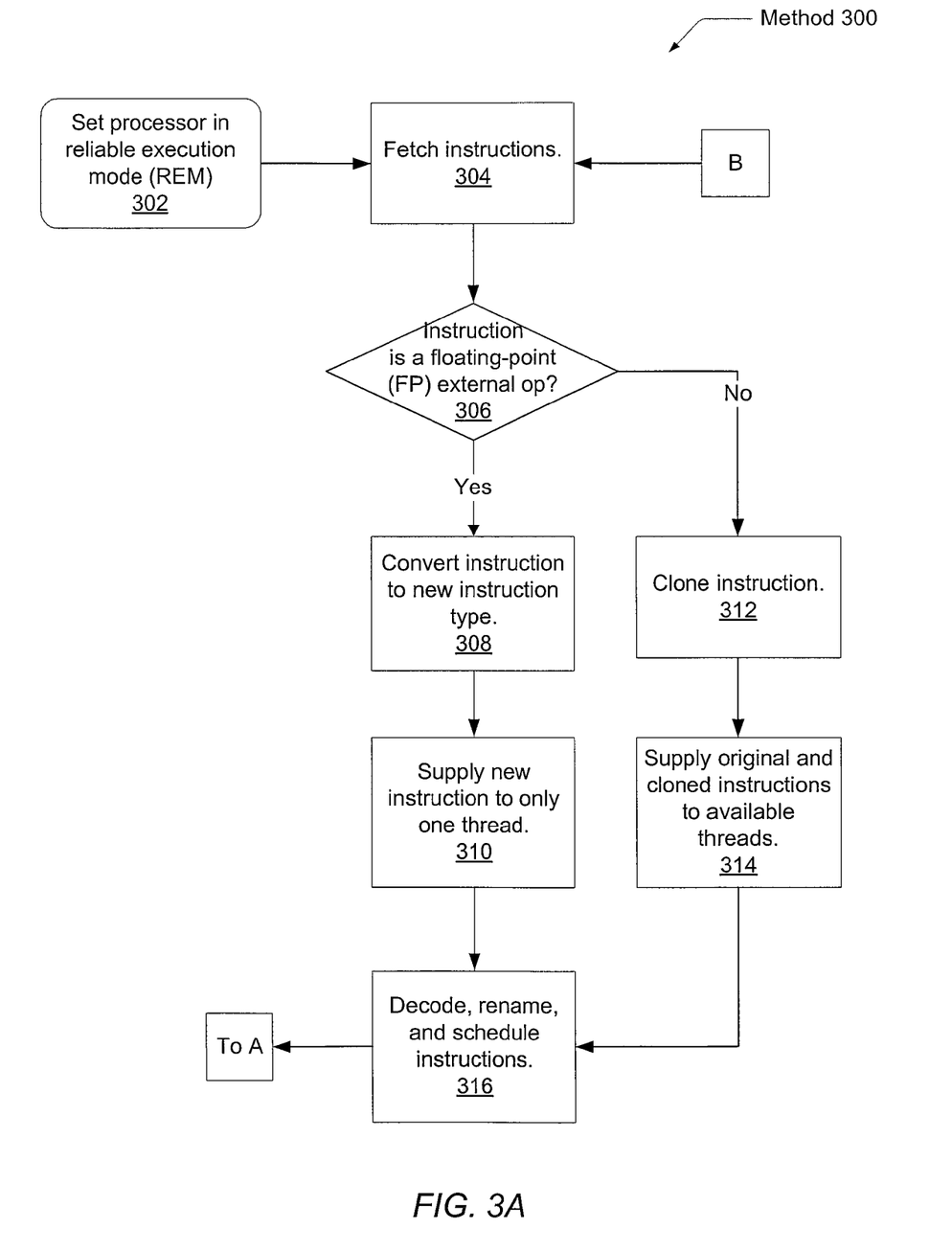
FIG. 3A is a flow diagram of one embodiment of a method for efficient reliable execution on a simultaneous multithreading processor.

Turning now to FIG. 3A, one embodiment of a method 300 for efficient reliable execution on a simultaneous multithreading processor is shown. For purposes of discussion, the steps in this embodiment are shown in sequential order. However, some steps may occur in a different order than shown, some steps may be performed concurrently, some steps may be combined with other steps, and some steps may be absent in another embodiment. A multi-threaded processor core within a microprocessor is set in reliable execution mode (REM) in block 302. This operation may be performed by a program code instruction, a system microcode instruction, a signal on a designated pin that is asserted or deasserted by outside control, or other.

The microprocessor's instruction fetch unit fetches instructions from a specified address of an i-cache in block 304. During REM operation, in one embodiment, the microprocessor may allow execution of only two strands, or hardware threads. Each fetched instruction may be selectively replicated. For example, if a floating-point instruction is not detected that communicates outside of the floating-point circuitry (conditional block 306), such as a floating-point store instruction, a floating-point integer-transfer instruction, or other, then these instructions of other computations are replicated in block 312. The original instruction is treated as an instruction of a first software thread and sent to a first strand. The instruction copy is treated as an instruction of a second software thread and sent to a second strand in block 314.

Both instruction detection and instruction replication may be performed in the decoder unit 206, the reorder buffer 208, the execution queues 212 and 216, or another front-end unit chosen by the designer. Pre-decode circuitry for just these floating-point external operations may be placed ahead of decoder unit 206. This technique may be used if integer cores are copied in core 200 that contain circuitry from decoder unit 206 to the integer functional units 214. Alternatively, the output signals of the decoder unit 206 may be used for detection of these operations, and replication may occur following decode. This technique may be used if the circuitry for decoder unit 206 to execution queues 212 and 216 are implemented as SMT circuits. Following, both the original instruction and replica instruction are assigned to separate strands in block 314, and renamed and scheduled for execution in block 316.

However, if a floating-point instruction is detected that communicates outside of the floating-point circuitry (conditional block 306), such as a floating-point store instruction, a floating-point integer-transfer instruction, or other, then this floating-point external operation or instruction may not be replicated. These instructions need a communication path, or wire routes, from the floating-point functional unit 218 to the integer functional units 214. Due to no copies of floating-point logic in functional unit 218, lockstep execution is going to be interrupted in all functional units 214 and 218 due to these instructions. Therefore, this instruction type may be converted to a new instruction type in block 308. Then this new instruction type, which is not replicated, is assigned to one of the available strands. For example, this new instruction type may be treated as an instruction of the original software thread and assigned to its corresponding strand in processor 200.

For example, for one embodiment of two strands within a microprocessor, a first strand may have 32 floating-point (FP) registers, such as from f0 to f31, and similarly for a second strand. A floating-point unit (FPU), which may comprise the circuitry of both queue 216 and unit 218, or alternatively, may comprise its own circuitry for the operations of decode unit 206 to queue 216, may need to maintain state for both strands. The FPU may require at least 64 logical registers, such as L0 to L63, that hold the committed architecture state of the two strands. A mapping such as from L0-L63 to Strand0.FP0-Strand0.FP31 and Strand1.FP0-Strand1.FP31 may be arbitrary. In one embodiment, a mapping may include an assignment for L0 to Strand0.FP0 and correspondingly, L31 to Strand0.FP31, and further, L32 to Strand1.FP0 and correspondingly, L63 to Strand1.FP31.

In a non-SMT machine, there may not be an assignment of L32 to L63. Now, in one embodiment, a simple FP operation such as FMUL FP0, FP1-->FP2 may be mapped to only one of FMUL L0, L1-->L2 or FMUL L32, L33->L34, depending on which strand it came from—Strand0 or Strand1. In REM/lockstep mode, there may be only one software thread executing, but this software thread may be made to execute on both hardware strands, Strand0 and Strand1. This may be accomplished by mapping the above floating-point multiply, FMUL, instruction to both FMUL L0, L1-->L2 and FMUL L32, L33->L34. This is the cloning operation described already.

Thus, once the above mapping is performed in the front-end of the FPU, strand identification on an operation may not be required to enforce dependencies between multiple operations due to the logical register numbers are sufficient to convey all dependencies. In one embodiment, operations from Strand0 may only reference registers L0 to L31 and operations from Strand1 may only reference registers from L32 to L63. No intermixing between the two sets may be possible in non-REM mode. Thus, once the operation is mapped, a strand ID may not be required for the operation, whether or not the microprocessor is operating in lockstep mode.

In REM mode, in one embodiment, once the clone operation is performed, two cloned operations may be created, neither of which may carry a strand identifier (ID) for scheduling purposes. It is noted, the strand ID is required, but for other purposes.

In one embodiment, a unary operation such as a floating-point store instruction, such as FSTO FP0-->[mem], wherein [mem] denotes a destination memory location, may not be cloned. Instead, the unary instruction may be mapped to a single binary logical instruction of the form FCMPSTO L0, L32-->[mem]. This logical instruction may not have a strand ID assigned to it. Rather, it may have all strand IDs assigned to it because it is using an intermixed set of logical registers that are drawn from all available strands.

This uniquely mapped instruction may draw its source operands from both strands and may be dependent on the last producer instruction of L0 and L32. By definition, the producers of L0 and L32 originated, in one embodiment, from Strand0 and Strand1. Also, these producers may have been cloned operations similar to the floating-point multiply instruction, FMUL. Those cloned operations may execute at different times such as when both L0 and L32 have been produced and are nonspeculative. Then the FCMPSTO may proceed to be scheduled for execution.

For further illustration, a floating-point external operation may be a floating-point store instruction such as the following:

| | |
|---|---|
| FDIV FP_Reg_Result, FP_Reg_Src1, FP_Reg_Src2 | /* line 1 */ |
| STF <address>, FP_Reg_Result | /* line 2 */ |

In one embodiment, the floating-point divide instruction, FDIV, in line 1 above may divide a 64-bit, double-precision floating-point source operand in the floating-point register designated by FP_Reg_Src1 by the 64-bit, double-precision floating-point source operand in the floating-point register designated by FP_Reg_Src2. No remainder may be preserved. The FDIV instruction may be replicated when processor 200 is operating in REM mode. The original FDIV instruction may be assigned to strand 0. A replicated FDIV instruction may be assigned to strand 1.

The floating-point store instruction, STF, in line 2 above may store a predetermined number of bytes from the source floating-point register, FP_Reg_Result, into the specified effective address, <address>. Similar to integer-transfer operations, floating-point store operations are unary operations. They have only one source operand. These particular unary operations may be transformed from unary to binary operations by creating a new instruction type that has two architectural sources—the original logical register number from the first thread and the same logical register number from the second thread. For example, if processor core 200 operates only two strands in REM mode, then the above floating-point store instruction may be converted to the following:

| | |
|---|---|
| STF <address>, FP_Reg_Result, FP_Reg_Result<br><strand 0>     <strand 1> | /* line 3 */ |

Thus, a floating-point store instruction is converted into a floating-point store-and-compare instruction. A renaming register file circuit may reside in reorder buffer 208 or the execution queues 212 and 216. In one embodiment, a mapping unit may transform an instruction register number (IRN) to a logical register number (LRN). The renaming register file then may map an LRN to a physical register number (PRN), wherein there is a greater number of physical registers than are addressable by direct use of the IRN. The operands, FP_Reg_Result <strand 0> and FP_Reg_Result <strand 1>, of the transformed operation in line 3 above are mapped to physical register numbers (PRNs) as usual and sent to the floating-point scheduler within floating-point queue 216. This floating-point external operation was not replicated, and the instruction shown in line 3 above may be assigned to strand 0 and a no-op instruction may be assigned to strand 1 in block 310 of method 300.

This transformed instruction naturally acts as a checkpoint, or a synchronization point, between the data flow of the two software threads executing in the two strands of processor core 200. Within the floating-point scheduler, which is not modified, in execution unit 210, the transformed operation may only be eligible and picked when both of its PRN sources become ready. This may naturally happen when the chains of computation performing the floating-point divide computation finish execution in the normal dataflow manner of the SMT floating-point functional unit 218 and feed results into the two source registers of the transformed operation, namely FP_Reg_Result <strand 0> and FP_Reg_Result <strand 1>.

Figure 3B:
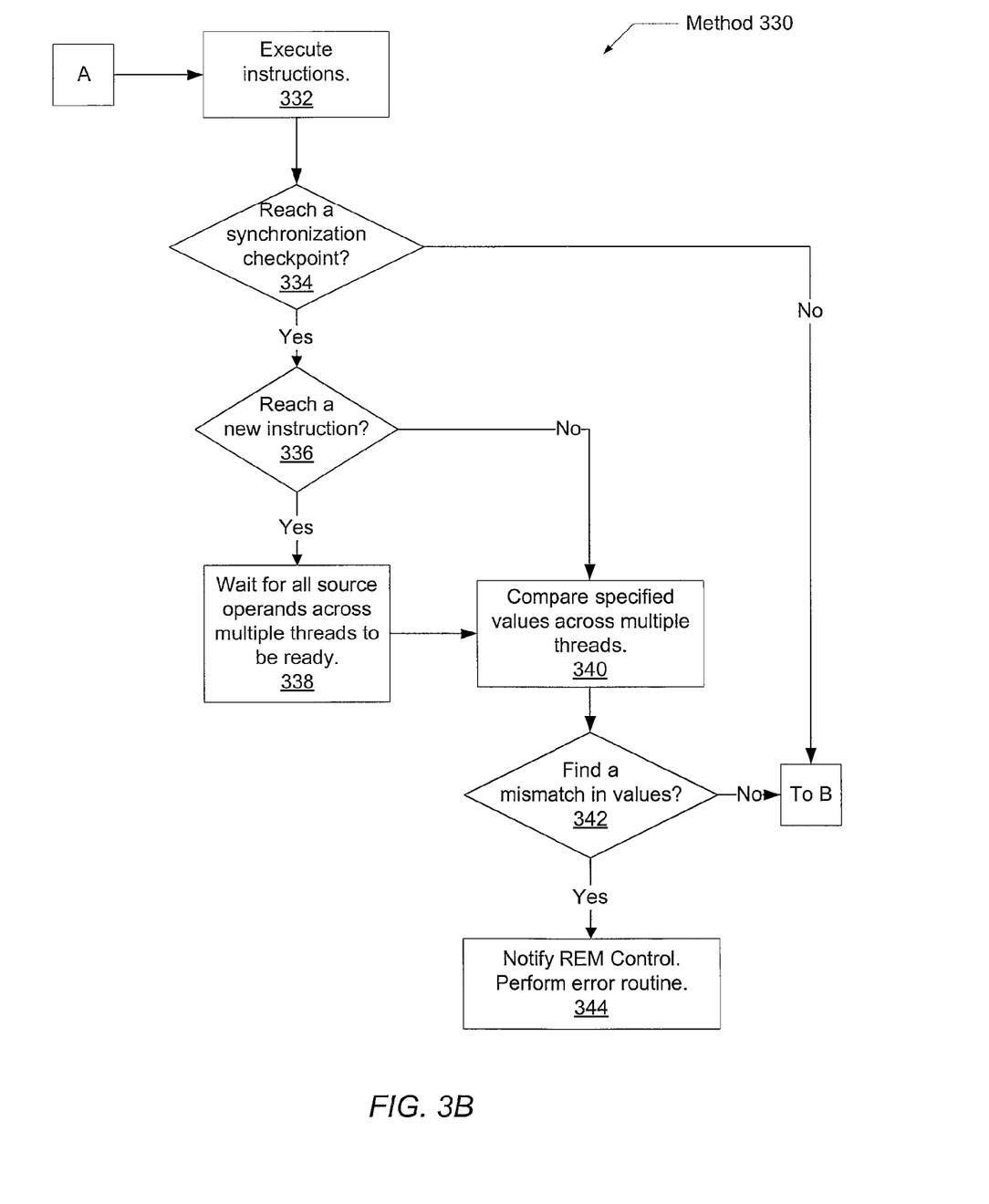
FIG. 3B is a flow diagram of one embodiment of a method for efficient reliable execution on a simultaneous multithreading processor.

Turning now to FIG. 3B, one embodiment of a method 330 for continuing efficient reliable execution on a simultaneous multithreading processor is shown. For purposes of discussion, the steps in this embodiment are shown in sequential order. However, some steps may occur in a different order than shown, some steps may be performed concurrently, some steps may be combined with other steps, and some steps may be absent in another embodiment. Processor core 200 is executing instructions in REM mode in block 332.

A synchronization point in program execution may be chosen to periodically verify that no errors, such as soft errors, have occurred in the execution of a mission critical software application. In one embodiment, one or more particular pipeline stages or outputs of particular combinatorial logic may be chosen to be a synchronization point in conditional block 334. This choice may only be possible if the parallel executing threads are executing in lockstep. If lockstep execution is possible, then specified values, such as particular register outputs, combinatorial logic outputs, and/or other specified values may be compared each clock cycle between the two strands in block 340. In one embodiment, a dummy unary move instruction of the form FMOV FP0-->FP0 may be inserted anywhere in the software program stream if more frequent checkpoints are desired. This FMOV instruction may then transform to a binary compare-and-move instruction, which may allow the checking to be performed with an arbitrary frequency, even in the absence of regular unary stores in the original program instruction stream.

Due to replicating instructions of a mission critical software application, and, in one embodiment, placing the original and twin copy in two separate strands on the processor comprising instantiated integer cluster copies, integer lockstep execution is feasible. Therefore, in one embodiment, each integer instruction and its twin may have their respective results compared to one another upon instruction completion within the same clock cycle (conditional block 334). In this case, the instructions are integer instructions (conditional block 336).

The comparison in block 340 may detect a situation when the two threads, in one embodiment, which should have the same result in the same clock cycle due to lockstep execution, have diverged. If a mismatch is detected (conditional block 342), it may be reported to logic in a REM controller and predetermined subsequent action may take place in block 344. Such actions may include asserting certain signals output from the microprocessor, halting further execution of the application, storing the address of the divergent instruction in a predetermined buffer, and/or other.

If no mismatch is detected (conditional block 342), then execution continues as normal in lockstep fashion and control flow of method 330 moves to control block B, which returns to block 304 of method 300. In another embodiment, a checkpoint instruction, which may be inserted in the program code either by the software programmer or by a compiler, may be used to provide a synchronization checkpoint (conditional block 334). In one embodiment, such an instruction may be inserted within every basic block of the code in order to keep the number of instructions to track in all lockstep executing threads small.

Another synchronization checkpoint may be the execution of a transformed floating-point external operation (conditional block 336). During execution, the front-end of the processor, such as a decoder unit 206 or a reorder buffer 208, may send instructions at half the normal throughput to the floating-point queue 216. This may be achieved by sending at most two floating-point instructions per clock cycle or by sending at most four floating-point instructions every other clock cycle. It is assumed for this example that processor core 200 is a 4-wide instruction issue machine. Other embodiments are possible and contemplated.

As described for block 312 in method 300, in one embodiment, logic in the processor front-end may selectively replicate these floating-point instructions. This logic will not replicate floating-point external operations such as floating-point store and integer-transfer operations. Rather, these floating-point instruction types are transformed as described above regarding block 308 of method 300.

In one embodiment, two strands within processor core 200 are used during REM operation. In one embodiment, logic resides in the processor front-end that replicates floating-point instructions that are not floating-point external operations in order to create an identical copy of a floating-point instruction from the original software thread, wherein the copy will be executed in a second software thread in a second strand of core 200. Both instructions will execute using logic within the floating-point functional unit 218 but not simultaneously due to lack of hardware resources. Then during execution of a transformed floating-point external instruction, such as shown in line 3 above, when all source operands are ready in block 338, other logic within execution unit 210 corresponding to floating-point operations may compare the contents of the same numbered register in the two strands in block 340. A mismatch (conditional block 342) will be flagged to the REM controller for appropriate action in block 344.

During REM operation, the execution of non-replicated but transformed floating-point external operations, which are the only instructions that communicate outside the floating-point logic 216 and 218, appears to execute simultaneously within the floating-point logic and signal the integer logic 212 and 214 in lockstep. All other floating-point instructions can actually execute out of lockstep in relation to its twin instruction in another software thread as these instructions do not send a stimulus outside the floating-point logic that could cause the integer logic to execute out of lockstep. The transformed floating-point external instruction reads its source operands when they are ready in block 338, which is support logic already existing in the SMT core and no modification is necessary, and compares them in block 340 for equality in parallel with its normal functionality. A mismatch (conditional block 342) may be reported to a REM controller in block 344. If there is no mismatch (conditional block 342), the instruction simply sends information to both the integer logic in the same cycle, which ensures that the integer functional units 214 see only lockstep stimuli from the floating-point logic and do not themselves fall out of sync.

Note that in the scheme described so far, retirement in the two clusters could get out of sync. This may be acceptable, because, in one embodiment, cross-checking two software threads operating in two strands of a processor includes comparing values immediately after execution using a signature of the result, rather than compare at retirement. Performing a comparison at retirement requires extra read ports on the physical register file. However, two situations arise that pose difficulties with the scheme described so far.

The first is the possibility of internal exceptions on one thread due to a logic fault that is not seen on the companion thread. Such an exception would cause a redirect and flush to be triggered on one thread while not on the other thread. This situation may be handled by adding extra logic to the processor front-end and dispatch logic that causes both threads to redirect if one does.

The second situation is asynchronous external interrupts. Such an interrupt cannot be serviced in lockstep unless both threads are in sync regarding retirement state. This requires that dispatch be stalled on an external interrupt until the instantiated integer logic copies and the floating-point logic have retired all outstanding instructions from both threads. This same mechanism can also be used to handle the internal exception case described above.

In an alternative embodiment, a lower performance scheme would be to send completion status for instructions from the retirement queue instead of the execution units via EPC. With this scheme, the EPC no longer sends status to the cluster ROBS but instead sends status to the FPRET block. Logic within FPRET keeps track of which ops have completed from both threads and then sends completion to the two clusters in lockstep for every op which has completed execution in both threads.

In yet another embodiment, the transformation of a floating-point external operation may convert a unary instruction to a tertiary instruction if processor core 200 has 3 or more available strands, or hardware threads. An example of a unary instruction to be transformed from line 2 above is again shown below in the following:

| | |
|---|---|
| FDIV FP_Reg_Result, FP_Reg_Src1, FP_Reg_Src2 | /* line 1 */ |
| STF <address>, FP_Reg_Result | /* line 2 */ |

If processor core 200 operates three strands during REM operation, then the above floating-point store instruction may be converted to the following:

STF <address>, FP_Reg_Result, FP_Reg_Result, FP_Reg_Result
/* line 4 */
        <strand 0>    <strand 1>    <strand 2>

Thus, a floating-point store instruction is converted into a three-operand floating-point store-and-compare instruction. The advantage of this implementation is during the comparison step, if any two strands, such as strands 0 and 1, have a match, but the third strand, such as strand 2, has a mismatched value, then appropriate signals may be sent to the REM controller to report the mismatch in block 344 of method 330, but execution may continue using the matched value of strands 0 and 1. The floating-point unit 218 may send this matched value to the instantiated integer logic 212 and 214. However, if all three strands have different values, then in block 344, it may be reported to logic in the REM controller and predetermined subsequent action may take place as described earlier. Such actions may include asserting certain signals output from the microprocessor, halting further execution of the application, storing the address of the divergent instruction in a predetermined buffer, and/or other.

Various embodiments may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. A computer-accessible medium may also include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a cache configured to store instructions of a computer program; and
   a processor;
   wherein the processor is configured to:
      replicate an original instruction of said instructions to create a copy of the original instruction, in response to determining the original instruction corresponds to a first instruction type;
      not replicate the original instruction of said instructions, in response to determining the original instruction corresponds to a second instruction type which is to be executed by a first functional unit, wherein there are M copies of the first functional unit, each copy corresponding to two or more threads of a plurality of threads, where M is a positive integer; and
      convert the original instruction of the second instruction type from a unary type having only one source operand to a binary type having two source operands; and
      execute the original instruction of the second instruction type as converted, in response to determining a source operand of the two source operands is ready from a first thread and a source operand of the two source operands is ready from at least one other thread of the plurality of threads.

2. The system as recited in claim 1, wherein in response to executing the original instruction of the second instruction type as converted, the processor is further configured to convey a single result from the first functional unit to a second functional unit corresponding to the first thread and to a third functional unit corresponding to another thread of the plurality of threads.

3. The system as recited in claim 2, wherein in response to determining the original instruction corresponds to a first instruction type, the processor is further configured to:
   assign the original instruction to a first thread of the plurality of threads; and
   assign the copy of the original instruction to at least one thread different from the first thread.

4. The system as recited in claim 2, wherein in response to detecting execution of the original instruction of the second instruction type as converted and determining each source operand is ready, the processor is further configured to compare values of each source operand to one another during said execution.

5. The system as recited in claim 4, wherein the processor is further configured to compare a result of the original instruction of the first instruction type and a result of at least one copy of the original instruction.

6. The system as recited in claim 5, wherein the processor is further configured to convey error information, in response to detecting a mismatch from one or more of the following: a comparison of said results, and a comparison of the source operands.

7. The system as recited in claim 6, wherein the first functional unit is an integer execution unit and the second functional unit is a floating-point unit (FPU).

8. The system as recited in claim 7, wherein the second instruction type is one or more of the following: floating-point store instruction and a floating-point integer-transfer instruction.

9. A method comprising:
   replicating an original instruction of a plurality of instructions to create a copy of the original instruction, in response to determining the original instruction corresponds to a first instruction type;
   not replicating the original instruction of said instructions, in response to determining the original instruction corresponds to a second instruction type to be executed by a first functional unit, wherein there are M copies of the first functional unit, each copy corresponding to two or more threads of a plurality of threads, where M is a positive integer; and
   converting the original instruction of the second instruction type from a unary type having only one source operand to a binary type having two source operands; and
   executing the original instruction of the second instruction type as converted, in response to determining a source operand of the two source operands is ready from a first thread and a source operand of the two source operands is ready from at least one other thread of the plurality of threads.

10. The method as recited in claim 9, wherein in response to executing the original instruction of the second instruction type as converted, the method further comprises conveying a single result from a single first functional unit to a second functional unit corresponding to the first thread and to at least one other second functional unit corresponding to another thread of the plurality of threads, wherein there are N copies of the second functional unit, each copy corresponding to a single different thread of the plurality of threads, wherein N is an integer greater than M.

11. The method as recited in claim 10, wherein in response to determining the original instruction corresponds to a first instruction type, the method further comprises:
   assigning the original instruction to a first thread of the plurality of threads; and
   assigning the copy of the original instruction to at least one thread different from the first thread.

12. The method as recited in claim 10, wherein in response to detecting execution of the original instruction of the second instruction type as converted and determining each source operand is ready, the method further comprises comparing the values of each source operand to one another during said execution.

13. The method as recited in claim 12, further comprising comparing a result of the original instruction of the first instruction type and a result of at least one copy of the original instruction, wherein the results are computed in a same pipeline stage.

14. The method as recited in claim 13, further comprising conveying error information, in response to detecting a mismatch from one or more of the following: the comparison of the results and the comparison of the source operands.

15. The method as recited in claim 14, wherein the first functional unit is an integer execution unit and the second functional unit is a floating-point unit (FPU).

16. The method as recited in claim 15, wherein the second instruction type is one or more of the following: a floating-point store instruction and a floating-point integer-transfer instruction.

17. A floating-point (FP) coprocessor comprising:
an interface configured to communicate with an instruction fetch unit, a cache, and two or more integer execution clusters (IECs), each IEC corresponding to a single different thread of a plurality of threads;
storage elements; and
circuitry, wherein the circuitry is configured to:
replicate an original instruction of a plurality of instructions to create a copy of the original instruction, in response to determining the original instruction corresponds to a first instruction type;
not replicate the original instruction of said instructions, in response to determining the original instruction corresponds to a second instruction type to be executed by a first functional unit, wherein there are M copies of the first functional unit, each copy corresponding to two or more threads of the plurality of threads, where M is a positive integer; and
convert the original instruction of the second instruction type from a unary type having only one source operand to a binary type having two source operands; and
execute the original instruction of the second instruction type as converted, in response to determining a source operand of the two source operands is ready from a first thread and a source operand of the two source operands is ready from at least one other thread of the plurality of threads.

18. The FP coprocessor as recited in claim 17, wherein in response to detecting execution of the original instruction of the second instruction type as converted, the circuitry is further configured to convey a single result from a single first functional unit to an IEC corresponding to the first thread and to at least one other IEC corresponding to another thread of the plurality of threads, wherein there are N copies of the IEC, each copy corresponding to a single different thread of the plurality of threads, wherein N is an integer greater than M.

19. The FP coprocessor as recited in claim 18, wherein in response to determining the original instruction corresponds to a first instruction type, the circuitry is further configured to:
assign the original instruction to a first thread of the plurality of threads; and
assign the copy of the original instruction to at least one thread different from the first thread.

20. The FP coprocessor as recited in claim 18, wherein in response to detecting execution of the original instruction of the second instruction type as converted determining each source operand is ready, the circuitry is further configured to compare the values of each source operand to one another during said execution.

* * * * *